US005156191A

United States Patent [19]

Walker et al.

[11] Patent Number: 5,156,191

[45] Date of Patent: Oct. 20, 1992

[54] HOSE ASSEMBLY HAVING A SPIDER-LIKE MEMBER HOLDING THE ENDS OF INNER AND OUTER HOSES THEREOF CONCENTRIC AND METHOD OF MAKING THE SAME

[75] Inventors: Glenn K. Walker, Miamisburg, Ohio; Rodger P. Grantham, Springfield; Guy L. Renshaw, Ash Grove, both of Mo.

[73] Assignee: Dayco Products, Inc., Dayton, Ohio

[21] Appl. No.: 717,850

[22] Filed: Jun. 19, 1991

Related U.S. Application Data

[60] Division of Ser. No. 152,612, Feb. 5, 1988, Pat. No. 5,056,569, which is a continuation of Ser. No. 913,060, Sep. 29, 1986, abandoned.

[51] Int. Cl.[5] .............................................. F16L 39/04

[52] U.S. Cl. .................................... 138/113; 138/109; 138/148; 285/133.1; 141/59; 29/890.144

[58] Field of Search ............... 138/109, 113, 114, 148; 285/133.1; 141/45, 59, 392; 29/890.144, 890.14

[56] References Cited

U.S. PATENT DOCUMENTS

| | | | |
|---|---|---|---|
| 2,056,840 | 10/1936 | Collom | 138/148 |
| 2,838,074 | 6/1958 | Lauck | 138/113 |
| 2,938,569 | 5/1960 | Goodrich | 138/113 |
| 2,956,586 | 10/1960 | Zeigler et al. | 285/133.1 |
| 2,959,193 | 11/1960 | Guldenzoph et al. | 138/113 |
| 3,638,970 | 2/1972 | Sandquist et al. | 285/133.1 |
| 3,980,112 | 9/1976 | Basham | 141/392 |
| 4,090,539 | 5/1978 | Krupp | 141/392 |
| 4,445,332 | 5/1984 | Thies et al. | 285/133.1 |
| 4,749,009 | 6/1988 | Faeth | 141/59 |
| 4,754,782 | 7/1988 | Grantham | 141/392 |
| 4,828,183 | 5/1989 | Fink | 141/59 |
| 4,922,971 | 5/1990 | Grantham | 141/392 |
| 4,930,544 | 6/1990 | Ziu | 138/113 |
| 4,951,720 | 8/1990 | Grantham | 285/133.1 |
| 5,005,613 | 4/1991 | Stanley | 141/45 |
| 5,018,260 | 5/1991 | Ziu | 138/113 |

*Primary Examiner*—James E. Bryant, III
*Attorney, Agent, or Firm*—Joseph V. Tassone

[57] ABSTRACT

A hose assembly and method of making the same are provided, the hose assembly having fluid passages therein for respectively conveying a volatile liquid in one direction from the container, the assembly comprising a flexible inner hose having an outer peripheral surface and defining an inner one of the passages, a flexible outer hose having an inner peripheral surface and being disposed around the inner hose, the inner peripheral surface of the outer hose and the outer peripheral surface of the inner hose defining an outer one of the passages, a coupling fixed to an end portion of the outer hose, a tubular fitting fixed to an end portion of the inner hose, and a holding unit holding the fitting and the end portion of the inner hose substantially concentrically within the coupling and the outer hose to define a continuation of the outer passage, the holding unit comprising a spider-like member having a ring telescopically disposed on the fitting and a plurality of substantially straight arms radiating outwardly from the ring and being engageable with the coupling, the spider-like member comprising a one-piece extruded part.

2 Claims, 2 Drawing Sheets

HOSE ASSEMBLY HAVING A SPIDER-LIKE MEMBER HOLDING THE ENDS OF INNER AND OUTER HOSES THEREOF CONCENTRIC AND METHOD OF MAKING THE SAME

CROSS REFERENCE TO RELATED APPLICATION

This application is a divisional patent application of its copending parent patent application, Ser. No. 152,612, filed Feb. 5, 1988, now U.S. Pat. No. 5,056,569, which, in turn, is a continuation patent application of its copending parent patent application, Ser. No. 913,060, filed Sep. 29, 1986, now abandoned.

BACKGROUND OF THE INVENTION

1. Field of the Invention

This invention relates to a new hose assembly and to a new method of making such a hose assembly.

2. Prior Art Statement

It is known to provide a hose assembly having fluid passages therein for respectively conveying a volatile liquid in one direction to a container and returning vapors of the volatile liquid from the container, the assembly comprising a flexible inner hose having an outer peripheral surface and defining an inner one of the passages, a flexible outer hose having an inner peripheral surface and being disposed around the inner hose, the inner peripheral surface of the outer hose and the outer peripheral surface of the inner hose defining an outer one of the passages, a coupling fixed to an end portion of the outer hose, a tubular fitting fixed to an end portion of the inner hose, and holding means holding the fitting and the end portion of the inner hose substantially concentrically within the coupling and the outer hose to define a continuation of the outer passage. For example, see the U.S. patent to Basham, U.S. Pat. No. 3,980,112.

SUMMARY OF THE INVENTION

It is a feature of this invention to provide a new hose assembly having a unique holding means for holding parts of the hose assembly substantially in concentric relation.

In particular, it was found according to the teachings of this invention that the holding means can comprise a spider-like member having a ring portion telescopically disposed on a fitting of the hose assembly and a plurality of arms radiating outwardly from the ring portion and being engageable with a coupling of the assembly.

For example, another embodiment of this invention provides a hose assembly having fluid passages therein for respectively conveying a volatile liquid in one direction to a container and returning vapors of the volatile liquid from the container, the assembly comprising a flexible inner hose having an outer peripheral surface and defining an inner one of the passages, a flexible outer hose having an inner peripheral surface and being disposed around the inner hose, the inner peripheral surface of the outer hose and the outer peripheral surface of the inner hose defining an outer one of the passages, a coupling fixed to an end portion of the outer hose, a tubular fitting fixed to an end portion of the inner hose, and holding means holding the fitting and the end portion of the inner hose substantially concentrically within the coupling and the outer hose to define a continuation of the outer passage, the holding means comprising a spider-like member having a ring portion telescopically disposed on the fitting and a plurality of arms radiating outwardly from the ring portion and being engageable with the coupling.

Accordingly, it is an object of this invention to provide a new hose assembly having fluid passages therein for respectively conveying a volatile liquid in one direction to a container and returning vapors of the volatile liquid from the container, the hose assembly of this invention having one or more of the novel features of this invention as set forth above or hereinafter shown or described.

Another object of this invention is to provide a new method of making such a hose assembly, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWINGS

FIG. 1 is a side view of the hose assembly of this invention being utilized for dispensing gasoline from a conventional curbside gasoline pump or the like to a nozzle means for insertion in the gasoline tank of a transportation vehicle or the like.

DESCRIPTION OF THE PREFERRED EMBODIMENTS

Figure 1:
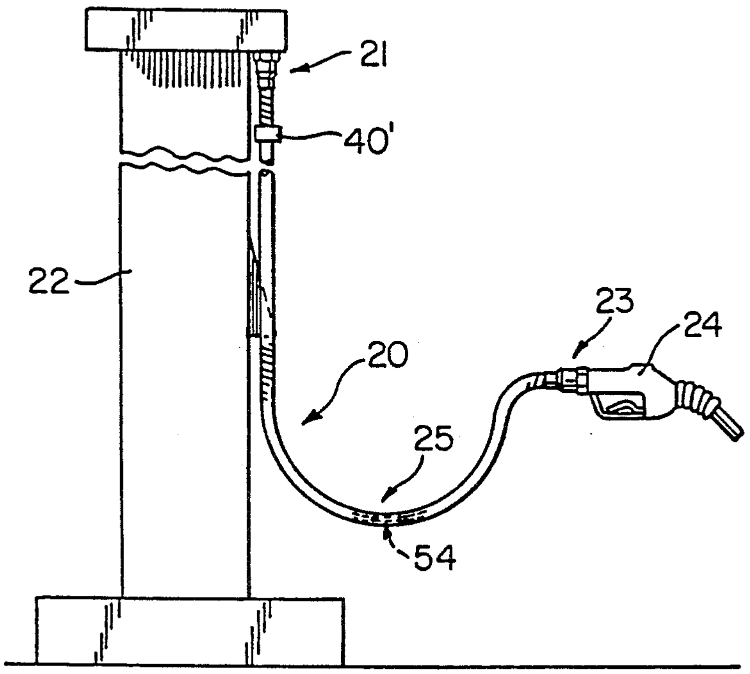

While the various features of this invention are hereinafter illustrated and described as being particularly adapted to provide a hose assembly for conveying volatile fluids, it is to be understood that the various features of this invention can be utilized singly or in various combinations thereof to provide a hose assembly for other purposes as desired.

Therefore, this invention is not to be limited to only the embodiments illustrated in the drawings, because the drawings are merely utilized to illustrate one of the wide variety of uses of this invention.

Figure 2:
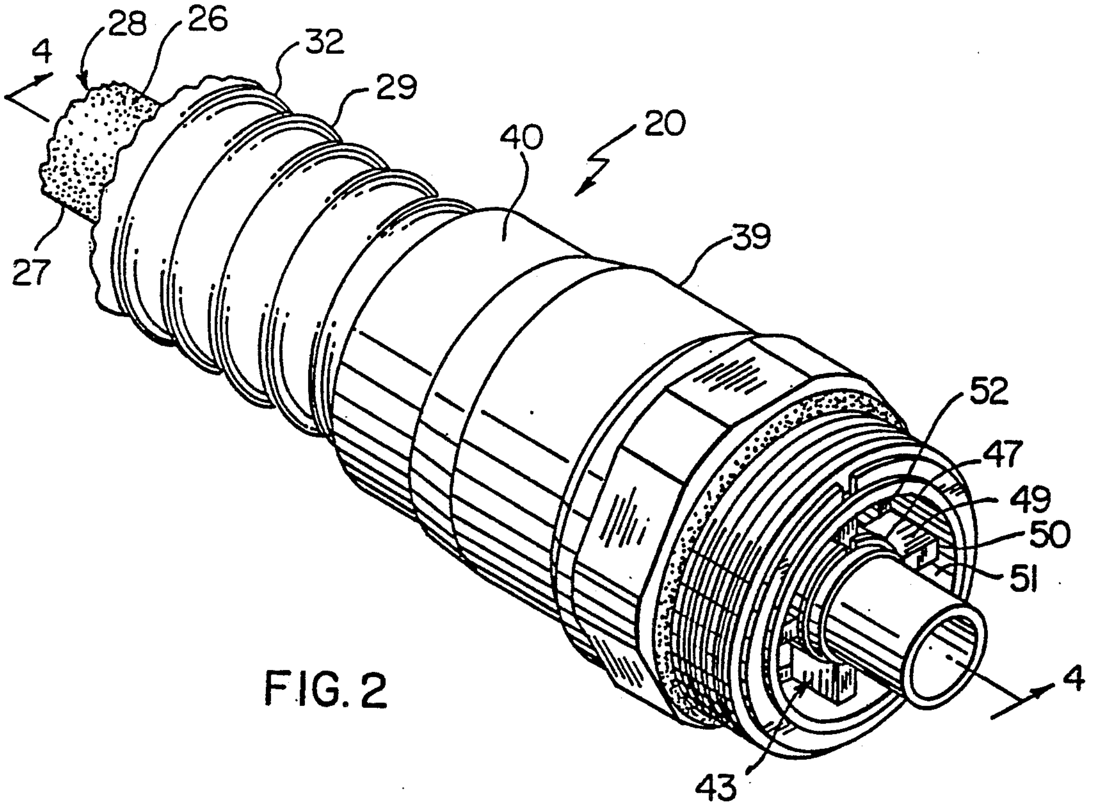
FIG. 2 is an enlarged fragmentary perspective view of one end of the hose assembly of this invention.

Referring now to FIGS. 1 and 2, the new hose assembly of this invention is generally indicated by the reference numeral 20 and is shown in FIG. 1 as having one end 21 thereof interconnected to a conventional gasoline pump 22 or the like and the other end 23 thereof interconnected to a conventional dispensing nozzle 24 which is shown in a normal position for dispensing fuel into the gas tank or storage container of a transportation vehicle or the like whereby an intermediate portion 25 of the hose assembly 20 provides a low portion thereof from which any collected liquid therein is to be removed by the hose assembly 20 of this invention in a manner and for the reasons set forth in the U.S. patent to Furrow et al, U.S. Pat. No. 4,566,504 whereby this patent is being incorporated into this disclosure by this reference thereto.

The hose assembly 20 comprises a flexible inner hose 26 having an outer peripheral surface 27 and defining an inner passage 28 therein through which the liquid from the pump means 22 is adapted to be conveyed in a direction toward the nozzle 24 in a conventional manner. The hose assembly 20 also comprises a flexible outer hose 29 that has an inner peripheral surface 30, FIG. 6, that cooperates with the outer peripheral surface 27 of the inner hose 26 to define an outer passage 31 therebetween and through which vapors of the dispensed volatile liquid can be returned from the nozzle means 24 back to the pump means 22 in a manner conventional in the art, such as set forth in the aforementioned U.S. patent to Furrow et al, U.S. Pat. No. 4,566,504 as well as in the aforementioned U.S. patent to Basham, U.S. Pat. No. 3,980,112 whereby this patent is also being incorporated into this disclosure by this reference thereto.

While the inner hose 26 has substantially smooth inner and outer peripheral surfaces, the main body portion 32 of the outer hose 29 of this invention is corrugated in a helical manner.

In addition, the outer hose 29 has a reinforcing wire-like member embedded therein and also being disposed in a helical manner along the length of the body portion 32 of the hose 29, the wire reinforcing member being formed of any suitable material, such as metallic material and thereby rendering the outer hose 29 substantially resistant to inward crushing thereof about the inner hose 26 for a purpose hereinafter set forth. However, because the body portion 32 of the outer hose 29 is corrugated in the manner previously set forth, the outer hose 29 is relatively flexible.

While the body portion 32 of the outer hose 29 can be formed of any suitable material, one working embodiment thereof comprises a precurved wire helix with an external urethane coating extruded thereon. Thereafter, an outer cover of urethane is extruded over the coated wire whereby the thus coated wire helps the preforming of the wire and enhances the adhesion of the outer urethane material to the reinforcing wire while the resulting structure has the wire effectively embedded thereon. Of course, the body portion 32 of the outer hose 29 could be formed of different materials and by a different method, if desired.

In order to attach outer couplings 39 to the opposed ends of the body portion 32 of the outer hose 29, substantially smooth and non-reinforced cylindrical cuffs 40 of urethane are respectively bonded or molded to the opposed ends of the outer hose 29 so that the cuffs 40 can be secured to the couplings 39 in any suitable manner, such as in the manner set forth in the aforementioned U.S. patent to Basham, U.S. Pat. No. 3,980,112.

Figure 4:
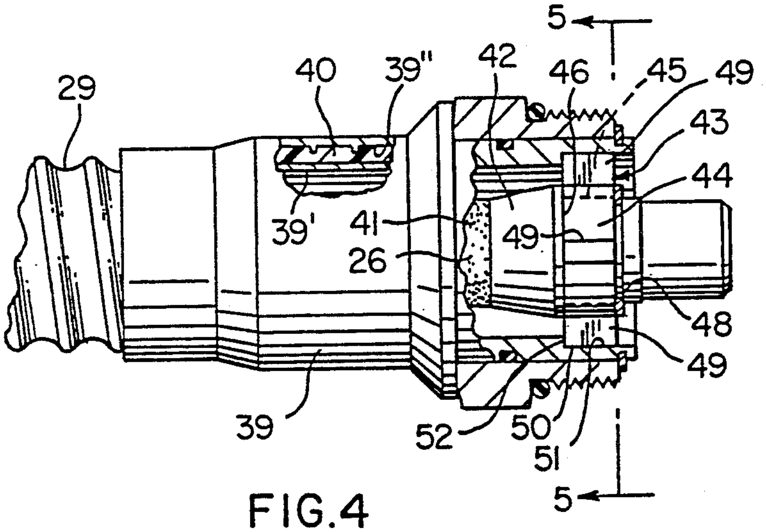
FIG. 4 is a fragmentary cross-sectional view taken on line 4—4 of FIG. 2.

However, as illustrated in FIG. 4, it can be seen that the cuff 40 of the outer hose 29 is inserted in the coupling 39 and an internal metallic sleeve 39' is radially outwardly expanded to compress the cuff 40 against the internal peripheral surface 39'' of the coupling 39 and also to hold the cuff in deformed relation into annular grooves of the coupling 39.

It is also to be understood that the outer hose 29 could be formed from other than the aforementioned plastic materials and thereby can comprise any suitable polymeric material that is resistant to gasoline, oil, etc.

For example, another working embodiment of the outer hose 29 of this invention was not corrugated but had a helically disposed wire reinforcing member embedded therein with the same being formed from an inner tube of nitrile rubber having a rayon braid laid on the same and then a jacket of nitrile rubber disposed on top of the rayon braid. The wire reinforcing helix was disposed on the jacket and then another rayon braid was disposed over the same. An outer cover was disposed on top of the outer rayon braid and comprised a compound of nitrile rubber and PVC with the resulting outer hose being relatively smooth on the inner and outer peripheral surfaces thereof. The ends of such outer hose were joined to couplings similar to couplings 39.

The inner hose 26 of the hose assembly 20 of this invention can also be formed of any suitable polymeric material and in one working embodiment thereof comprises a tube of nitrile rubber that is wire reinforced and has a cover of a compound comprising nitrile rubber and PVC.

Figure 3:
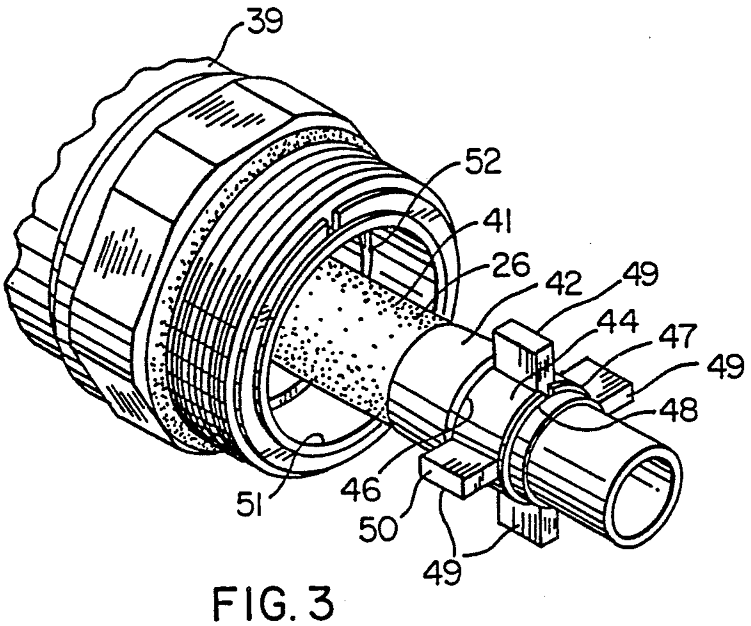
FIG. 3 is a view similar to FIG. 2 and illustrates the inner hose of the hose assembly pulled outwardly relative to the outer hose thereof.

As illustrated in FIGS. 3 and 4, each opposed end portion 41 of the inner hose 26 is attached to a metallic fitting 42 substantially in the same manner set forth above in regard to the coupling 39 or as in the aforementioned patent to Basham, U.S. Pat. No. 3,980,112 and the interconnected fitting 42 is held in substantially concentric relation within its cooperating coupling 39 by a holding means of this invention that is generally indicated by the reference numeral 43.

The holding means 43 is formed from any suitable material, such as extruded aluminum, and has a ring-like portion 44 adapted to be telescopically disposed on a cylindrical portion 45 of the fitting 42 and be held against a shoulder 46 thereof by a C-ring 47 received in an annular groove 48 in the fitting 42. The holding means 43 includes a plurality of integral arms or legs 49 extending radially outwardly from the ring portion 44 and in spaced apart relation so that the end surfaces 50 of the arms 49 are adapted to engage against an internal peripheral surface 51 of the coupling 39 to maintain the concentric relationship illustrated in FIG. 4.

In addition, the arms 49 of the holding means 43 are adapted to abut against an internal shoulder 52 of the coupling 39 to positively connect the inner and outer hoses 26 and 29 together.

In particular, with the inner hose 29 having one end thereof fixed to the pump 22 by its coupling 39 and fitting 42, a person pulling on the outer hose 29 toward the nozzle 24 causes the coupling 39 adjacent the nozzle 24 to have its shoulder 52 engage against the arms 49 of the holding means 43 and thereby not be movable relative to the inner hose 26 as the holding means 43 is fastened to the inner hose 26 at the fitting 42 thereof as previously set forth.

Therefore, by utilizing the interlocking feature of the holding means 43 as previously described, the outer hose 29 can be formed of the aforementioned lightweight plastic material.

Figure 5:
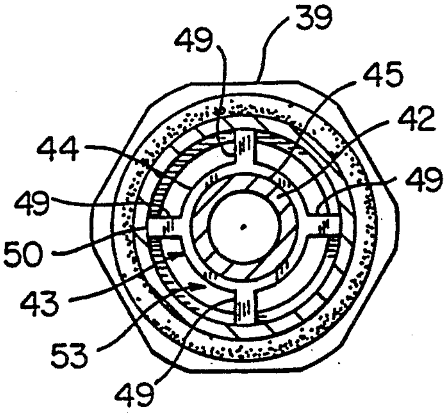
FIG. 5 is a cross-sectional view taken on line 5—5 of FIG. 4.

Also, it can be seen that the spacing 53 between the arms 49 of the holding means 43 as illustrated in FIG. 5 provide a continuation of the outer passage 31 of the hose assembly 20 for conveying vapors therethrough for the purpose fully set forth in the aforementioned patent to Basham, U.S. Pat. No. 3,980,112.

As fully described in the aforementioned U.S. patent to Furrow et al, U.S. Pat. No. 4,566,504, liquid in the outer passage 31 of the hose assembly 20 tends to collect at the low point or area 25 as illustrated in FIG. 1 and it is known from others to include a Venturi means 54 in the inner hose 26 so that the same can have its inlet means disposed in the passage means 31 at the area 25 for sucking the liquid from that area 25 back into the inner passage 28 and, thus, to the nozzle 24 as the liquid flows through the inner passage 28 from the pump 22 and passes through the Venturi means to the nozzle 24.

Thus, it can be seen that in the operation of the hose assembly 20 of this invention, the inner passage 28 thereof is adapted to permit a flow of fuel from the pump 20 out through the nozzle 24 in a conventional manner and as a flow of fuel passes through the inner passage 28, the flow of fuel causes the Venturi means 54 to act as a pump and thereby draw by suction any liquid that collects in the outer passage 31 in the low area 25 thereof into that flowing stream of fuel through the inner passage 28 to tend to remove the same from blocking the outer passage 31 which is utilized for returning vapors from the nozzle 24 back to the pump means 22 in the manner fully set forth in the aforementioned U.S. patents to Furrow et al, U.S. Pat. No. 4,566,504, and to Basham, U.S. Pat. No. 3,980,112.

From the above, it can be seen that the hose assembly 20 of this invention is relatively lightweight and flexible while still being adapted to withstand the constant abuse that is normally provided at filling stations and the like, such as the constant flexing, abrasion, pulling etc., that is associated with any curb pump hose arrangement. In addition, the outer hose 29 of the hose assembly 20 of this invention provides sufficient support through the wire reinforcing means thereof to protect the Venturi means 54 of the inner hose 26 that is utilized in the vapor recovery operation as previously described.

The inner hose 26 of the hose assembly 20 of this invention is adapted to handle end forces that result from excess pulling on the hose assembly 20 because the inner hose 26 utilizes a wire braid reinforcing construction.

The outer hose 29 is lightweight and flexible while still being rigid enough to protect the Venturi means 54 because the same is corrugated for flexibility, has the wire reinforcement means for protection and is formed of urethane to provide the light weight thereof.

The spider-like holding means 43 of this invention which hold the couplings 39 and fittings 42 at each end of the hose assembly 20 in concentric relation also transfer any end pull forces on the outer hose 29 to the inner hose 26 and thereby permits the use of a lightweight and flexible outer hose 29.

Also, it can be seen that the attaching of the outer hose 29 to the non-reinforced cuffs 40 each of which have smooth inner and outer peripheral surfaces allows for internal expansion of a sleeve 39' in each coupling 39 to improve the vapor flow therethrough, each expanded length 39' also acting as a strain reliever that minimizes bends on both the inner and outer hoses 26 and 29. Also, a clip (not shown) can be attached to the wire reinforcement 38 through the cuff 40 and be attached to the outer coupling 39 so as to act as a static ground.

In addition, it can be seen that other polymeric structure can be molded or bonded to the outer hose 29 of the hose assembly in the same manner as the cuffs 40. For example, a suitable member 40', FIG. 1, can be molded or bonded to an intermediate part of the outer hose 29 and provide a means for attaching a conventional spring loaded reel-in line (not shown) from the pump means 22 to the hose assembly 20. Of course, such member 40' could be formed of other material and can merely be fastened to the outer hose 29 by fastening means other than by molding or bonding, as desired.

Thus, it can be seen that this invention provides a new method of making such a hose assembly.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a hose assembly having fluid passages therein for respectively conveying a volatile liquid in one direction to a container and returning vapors of said volatile liquid from said container, said assembly comprising a flexible inner hose having an outer peripheral surface and defining an inner one of said passages, a flexible outer hose having an inner peripheral surface and being disposed around said inner hose, said inner peripheral surface of said outer hose and said outer peripheral surface of said inner hose defining an outer one of said passages, a coupling fixed to an end portion of said outer hose, a tubular fitting fixed to an end portion of said inner hose, and holding means holding said fitting and said end portion of said inner hose substantially concentrically within said coupling and said outer hose to define a continuation of said outer passage, the improvement wherein said holding means comprises a spider-like member having a ring telescopically disposed on said fitting and a plurality of substantially straight arms radiating outwardly from said ring and being engageable with said coupling, said spider-like member comprising a one-piece extruded part.

2. In a method of making a hose assembly having fluid passages therein for respectively conveying a volatile liquid in one direction to a container and returning vapors of said volatile liquid from said container, said assembly comprising a flexible inner hose having an outer peripheral surface and defining an inner one of said passages, a flexible outer hose having an inner peripheral surface and being disposed around said inner hose, said inner peripheral surface of said outer hose and said outer peripheral surface of said inner hose defining an outer one of said passages, a coupling fixed to an end portion of said outer hose, a tubular fitting fixed to an end portion of said inner hose, and holding means holding said fitting and said end portion of said inner hose substantially concentrically within said coupling and said outer hose to define a continuation of said outer passage, the improvement comprising the step of forming said holding means to comprise a one-piece extruded spider-like member having a ring telescopically disposed on said fitting and a plurality of substantially straight arms radiating outwardly from said ring and being engageable with said coupling.

* * * * *